(12) United States Patent
Schramm et al.

(10) Patent No.: US 10,841,101 B2
(45) Date of Patent: Nov. 17, 2020

(54) METHOD FOR THE SECURE AUTHENTICATION OF CONTROL DEVICES IN A MOTOR VEHICLE

(71) Applicant: Bayerische Motoren Werke Aktiengesellschaft, Munich (DE)

(72) Inventors: Andreas Schramm, Wegscheid (DE); Richard Wimmer, Anzing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/240,090

(22) Filed: Jan. 4, 2019

(65) Prior Publication Data

US 2019/0140845 A1   May 9, 2019

Related U.S. Application Data

(63) Continuation of application No. PCT/EP2017/061013, filed on May 9, 2017.

(30) Foreign Application Priority Data

Jul. 5, 2016   (DE) .......................... 10 2016 212 230

(51) Int. Cl.
   *H04L 9/32*       (2006.01)
   *G06F 21/30*      (2013.01)
   (Continued)

(52) U.S. Cl.
   CPC .......... *H04L 9/3263* (2013.01); *G06F 21/305* (2013.01); *G07C 5/008* (2013.01);
   (Continued)

(58) Field of Classification Search
   CPC .............. H04L 9/3263; H04L 63/0823; H04L 63/0428; H04L 2209/84; H04L 67/12;
   (Continued)

(56) References Cited

U.S. PATENT DOCUMENTS 8,222,989 B2   7/2012   Ziska et al.
10,124,766 B2  11/2018  Brahner et al.
(Continued)

FOREIGN PATENT DOCUMENTS

DE        100 21 811 A1    11/2001
DE    10 2005 024 818 A1   11/2006
(Continued)

OTHER PUBLICATIONS

PCT/EP2017/061013, International Search Report dated Aug. 2, 2017 (Three (3) pages).
(Continued)

*Primary Examiner* — Abu S Sholeman
(74) *Attorney, Agent, or Firm* — Crowell & Moring LLP

(57) ABSTRACT

A method for secure authentication of control apparatuses in a motor vehicle includes sending an authentication request to a control apparatus of the motor vehicle, receiving an authentication response of the control apparatus and checking the received authentication response. If a result of the checking is that the received authentication response is invalid, the method further includes transferring the control apparatus to a fallback mode, where the fallback mode being safe for the purposes of a dependability of the applicable motor vehicle. The authentication response of the control apparatus is provided based on at least part of authenticity information of the control apparatus. The transmitting of the authentication request and authentication response is effected in an encrypted fashion in each case, and the checking of the received authentication response includes decrypting the received authentication response.

19 Claims, 6 Drawing Sheets

(51) Int. Cl.
  *H04L 29/06* (2006.01)
  *G07C 5/00* (2006.01)
  *H04L 9/30* (2006.01)
  *H04L 29/08* (2006.01)

(52) U.S. Cl.
  CPC .......... *H04L 9/3073* (2013.01); *H04L 9/3218* (2013.01); *H04L 63/0428* (2013.01); *H04L 63/0442* (2013.01); *H04L 63/0823* (2013.01); *H04L 63/108* (2013.01); *H04L 63/12* (2013.01); *H04L 67/12* (2013.01); *H04L 2209/84* (2013.01)

(58) Field of Classification Search
  CPC . H04L 63/108; H04L 63/0442; H04L 9/3218; H04L 9/3073; H04L 63/12; G07C 5/008; G06F 21/305
  See application file for complete search history.

(56) References Cited

U.S. PATENT DOCUMENTS

| | | | |
|---|---|---|---|
| 2003/0036831 A1* | 2/2003 | Glock | B60C 23/061 701/33.7 |
| 2004/0003232 A1 | 1/2004 | Levenson et al. | |
| 2005/0009320 A1* | 1/2005 | Goundar | H01L 21/76801 438/624 |
| 2005/0097320 A1* | 5/2005 | Golan | G06F 21/40 713/166 |
| 2006/0149966 A1 | 7/2006 | Buskey et al. | |
| 2010/0077446 A1* | 3/2010 | Umezawa | H04L 63/205 726/2 |
| 2014/0025950 A1* | 1/2014 | Peeters | G06K 7/10227 713/168 |
| 2016/0277923 A1* | 9/2016 | Steffey | H04W 12/04 |
| 2016/0360413 A1* | 12/2016 | Norrman | H04W 36/0022 |
| 2018/0352448 A1* | 12/2018 | Ryu | H04W 8/04 |

FOREIGN PATENT DOCUMENTS

| | | |
|---|---|---|
| DE | 10 2014 018 460 A1 | 6/2016 |
| EP | 1 999 725 B1 | 11/2011 |
| EP | 2 866 207 A1 | 4/2015 |

OTHER PUBLICATIONS

German Search Report issued in German counterpart application No. 10 2016 212 230.4 dated Apr. 21, 2017, with Statement of Relevancy (Twelve (12) pages).

Wolf et al., "Embedded security in cars: securing current and future automotive IT applications", Jan. 1, 2006, Springer, Berlin, XP055361472, 279 total pages.

* cited by examiner

METHOD FOR THE SECURE AUTHENTICATION OF CONTROL DEVICES IN A MOTOR VEHICLE

CROSS REFERENCE TO RELATED APPLICATIONS

This application is a continuation of PCT International Application No. PCT/EP2017/061013, filed May 9, 2017, which claims priority under 35 U.S.C. § 119 from German Patent Application No. 10 2016 212 230.4, filed Jul. 5, 2016, the entire disclosures of which are herein expressly incorporated by reference.

BACKGROUND AND SUMMARY OF THE INVENTION

The present invention relates to a method for secure authentication of control apparatuses in a motor vehicle.

In established vehicle electrical systems, communication with controllers takes place via CAN or Ethernet.

What are known as "man in the middle attacks", for example by means of CAN simulation boxes, are thus possible. These allow unauthorized exchange of components in the field and therefore encourage component theft, component forgery and also the use of alternative components that do not meet the quality and/or safety criteria of the vehicle manufacturer.

It would thus be desirable to provide a possible way in which increased security against unauthorized component installation could be ensured.

It is an aim of the invention to propose a possible way in which at least some of the disadvantages known in the prior art are avoided or at least reduced.

The object is achieved according to the invention by means of a method as claimed in the main claim and by means of apparatuses as claimed in coordinate claims.

The subject matter of the main claim relates in this instance to a method for secure authentication of control apparatuses in a motor vehicle, the method involving: sending an authentication request to a control apparatus of the motor vehicle, receiving an authentication response of the control apparatus, checking the received authentication response, and, if the result of the checking is that the received authentication response is invalid, transferring the control apparatus to a fallback mode. In this case, the fallback mode is safe for the purposes of a dependability of the applicable motor vehicle. Furthermore, in this case the authentication response of the control apparatus is provided based on at least part of authenticity information of the control apparatus, the transmitting of the authentication request and authentication response is effected in encrypted fashion in each case, and the checking of the received authentication response involves decrypting the received authentication response.

The method steps can be performed in automated fashion in this case.

A control apparatus for the purposes of the invention may in this instance be an apparatus controlling parts of the motor vehicle. By way of example, this may be a motor controller, or equally a controller for the seat position. In particular, the control apparatus may be a head unit.

An authentication request for the purposes of the invention be a request to trigger a response from the control apparatus to which the request is addressed, which the control apparatus uses to disclose its identity to the requesting apparatus such that it is possible to establish in the requesting apparatus whether the control apparatus to which the request is addressed is authentic. This means that it is possible to establish in the requesting apparatus whether or not the requesting apparatus identifies the control apparatus to which the request is addressed as already known and authenticated, that is to say authorized.

An authentication response for the purposes of the invention means information that reveals which control apparatus is involved. By way of example, this information may allow the requesting apparatus to deduce whether the apparatus to which the request is addressed is the originally installed control apparatus, or whether it has been replaced illegally. Should the originally installed control apparatus have been replaced, this may have been effected by means of a stolen control apparatus or else by means of a control apparatus not certified by the manufacturer, for example. In the case of the latter, a functional safety of the relevant motor vehicle may thus possibly not be ensured. In particular in this case, it can make sense to transfer the relevant control apparatus to a functionally safe mode. In the extreme case, this can also mean shutting down the relevant control apparatus. By way of example, this can be effected by virtue of the relevant control apparatus no longer being supplied with electric current, that is to say that it is electrically disconnected.

Checking the received authentication response for the purposes of the invention can in this instance mean a process in which the received authentication response is taken as a basis for establishing whether the control apparatus to which the request is addressed is known and is authorized in the relevant motor vehicle, for example that is to say whether it is the control apparatus originally delivered ex works or the control apparatus has been replaced in certified fashion, for example after an irreparable defect.

Transferring the control apparatus to a fallback mode for the purposes of the invention can in this instance mean that particular features of the relevant control apparatus are shut down so as to put the control apparatus into a mode that is deemed functionally safe for the motor vehicle and is therefore manageable. This can lead to complete shutdown of this control apparatus in the extreme case.

Safety in the sense of dependability of the applicable motor vehicle for the purposes of the present invention means that the motor vehicle is functionally safe and therefore manageable. This can be achieved by means of activation of just basic functionalities of the relevant control apparatus, for example. By way of example, in the example of a speed regulating system with automatic distance control as a control apparatus, this can lead to the control apparatus, if it is not identified as authentic, being switched to a fallback mode in which only a cruise control functionality, for example, is deemed dependable. Therefore, the control apparatus itself could no longer be used to speed up or slow down by pressing a key. Further, in this case, it would also be possible for the automatic distance control to be shut down, since, by way of example, it can no longer be regarded as guaranteed that the automatic distance control works reliably.

Authenticity information for the purposes of the invention can in this instance mean information that is kept in the control apparatus. Preferably, this information should be kept in protected fashion so that it cannot be read and transmitted to a further control apparatus. The authenticity information can thus be provided, by way of example, from suitable combining of explicit and/or individual information of the monitoring apparatus that makes a request to the control apparatus and vehicle information, such as, for example, a chassis number. The information ascertained by means of suitable combination may be the authenticity information in this instance. From this, it should preferably no longer be possible to be able to explicitly infer the original information, such as monitoring apparatus information and vehicle information. In this case, only the monitoring information should be able to ascertain from the authentication information transmitted by means of the authenticity information whether the relevant control apparatus is authentic.

The teaching according to the invention achieves the advantages that it can be ensured that only authentic control apparatuses in the motor vehicle can use their full scope of functions. A further advantage is that unauthorized control apparatuses, forged control apparatuses and/or stolen control apparatuses can be identified in order to prevent them from being able to be used fully without permission or certification. A further advantage is that this makes it possible to ensure that control apparatuses installed in the motor vehicle can be regarded as dependable. A further advantage is that installed control apparatuses can always be operated in a dependable mode and can be shut down in the extreme case in order to prevent undependable driving.

The subject matter of one coordinate claim relates in this instance to a control apparatus for a motor vehicle, the control apparatus having: a reception means, for receiving an authentication request, a transmission means, for sending an authentication response, an ascertainment means, for ascertaining the authentication response, based on at least part of authenticity information of the control apparatus, an encryption means, for encrypting the authentication response, and a decryption means, for decrypting the authentication request, and in this instance the control apparatus is configured to perform that part of a method according to the invention that relates to the control apparatus.

The teaching according to the invention achieves the advantage that a control apparatus can be provided that can prove its authenticity.

The subject matter of one coordinate claim relates in this instance to a monitoring apparatus for a motor vehicle, the monitoring apparatus having: a transmission means, for sending an authentication request to a control apparatus of the motor vehicle, a reception means, for receiving an authentication response of the control apparatus, an encryption means, for encrypting the authentication request, a decryption means, for decrypting the authentication response, and a checking means, for checking the received authentication response such that if the result of the checking is that the received authentication response is invalid, the monitoring apparatus is configured to transfer the control apparatus to a fallback mode. In this instance, the fallback mode is safe for the purposes of a dependability of the applicable motor vehicle, and in this case the monitoring apparatus is configured to perform that part of a method according to the invention that relates to the monitoring apparatus.

The teaching according to the invention achieves the advantage that an apparatus can be provided that can be used to ensure that only authentic control apparatuses in the motor vehicle can use their full scope of functions. A further advantage is that unauthorized control apparatuses, forged control apparatuses and/or stolen control apparatuses can be identified in order to prevent them from being able to be used fully without permission or certification. A further advantage is that this makes it possible to ensure that control apparatuses installed in the motor vehicle can be regarded as dependable. A further advantage is that installed control apparatuses can always be operated in a dependable mode and can be shut down in the extreme case in order to prevent undependable driving.

The subject matter of a further coordinate claim relates in this instance to a motor vehicle, having a control apparatus according to the invention and a monitoring apparatus according to the invention, and in this case the control apparatus according to the invention and the monitoring apparatus according to the invention are together configured to perform any method according to the invention.

The teaching according to the invention achieves the advantage that a motor vehicle can be provided that is configured to independently establish whether there are unauthentic control apparatuses in the motor vehicle and these can then adversely influence the dependability of the motor vehicle.

The subject matter of a further coordinate claim relates in this instance to a computer program product for a control apparatus, a monitoring apparatus and/or a motor vehicle, each of which is operable using any method according to the invention.

The teaching according to the invention achieves the advantage that the method can be performed in automated fashion particularly efficiently.

The subject matter of a further coordinate claim relates in this instance to a data storage medium having a computer program product according to the invention.

The teaching according to the invention achieves the advantage that the method can be distributed or kept on the apparatuses, systems and/or motor vehicles performing the method particularly efficiently.

Before embodiments of the invention are described in more detail below, it should first of all be stated that the invention is not restricted to the components described or the method steps described. Additionally, the terminology used is also not a limitation, but rather merely has an exemplary character. Where the description and the claims use the singular, this also covers the plural in each case, unless the context explicitly precludes this. Any method steps can be performed in automated fashion, unless the context explicitly precludes this. Applicable method sections can lead to applicable apparatus properties and vice versa, which means that, unless the context explicitly precludes this, it is possible for a method feature to be changed into an apparatus feature and vice versa.

Further exemplary embodiments of the method according to the invention are explained below.

According to a first exemplary embodiment, the method further involves the authentication response of the control apparatus being based on modified information from at least part of the authenticity information of the control apparatus.

Modified information for the purposes of the invention may in this instance be information that can be formed by means of the authenticity information kept in the relevant control apparatus, in order to prove the authenticity of the relevant control apparatus, but without having to divulge the authenticity information as such.

This embodiment has the advantage that increased security against theft of the proof of authenticity of the control apparatus can be achieved.

According to a further exemplary embodiment, the method further involves the modified information permitting no explicit conclusion about the authenticity information of the control apparatus. Preferably, the modified information permits no explicit conclusion about the exact authenticity information of the control apparatus.

This embodiment has the advantage that increased security against theft of the proof of authenticity of the control apparatus can be achieved.

According to a further exemplary embodiment, the method further involves the encrypted transmitting of the authentication request and authentication response being effected by means of an asymmetric encryption, preferably by means of a private/public key method.

This embodiment has the advantage that increased security against theft and/or manipulation of the proof of authenticity of the control apparatus can be provided.

According to a further exemplary embodiment, the method further involves the sending of the authentication request being triggered periodically, preferably after a stipulated period of time has elapsed.

In particular, in an assisted driving mode, such as, for example, lane departure warning, automatic distance control and the like, a highly automated driving mode or an autonomous driving mode, it may make sense, before the applicable driving mode is commenced, such an authentication request to be triggered in order to be able to check whether the relevant component or components is/are authentic and therefore dependable. Otherwise, the applicable desired driving mode can be rejected by the monitoring apparatus, the vehicle system and/or by the vehicle.

This embodiment has the advantage that it is possible to establish at regular intervals whether unauthenticated control apparatuses are installed. It is therefore possible to ensure that dependability exists on the basis of a manageable scope of functions of the installed control apparatuses of the motor vehicle at regular intervals.

According to a further exemplary embodiment, the method further involves, if the result of the checking (30) is that the received authentication response (21) is invalid, the result of the check (30) being passed to an applicable diagnosis backend (450) and/or information backend (460) of the applicable vehicle manufacturer.

This embodiment has the advantage that transferring the control apparatus to a fallback mode, that can become known on the applicable backend, as a result of which it is accordingly simple to initiate unlocking of the control apparatus from the fallback mode if the negative check result does not apply or the control apparatus has been replaced properly as appropriate.

According to a further exemplary embodiment, the method further involves the sending of the authentication request being triggered when an external motor vehicle information apparatus and/or an external motor vehicle diagnosis apparatus is/are used.

A motor vehicle information apparatus for the purposes of the invention may in this instance be an apparatus by means of which information regarding states and/or manners of operation of control apparatuses and the like can be read, for example by an expert.

A motor vehicle diagnosis apparatus for the purposes of the invention may in this instance be an apparatus by means of which states and/or manners of operation of control apparatuses and the like can be read and/or diagnosed, for example in a garage, and information regarding repair, maintenance and the like can be stored and/or modified in the motor vehicle.

This embodiment has the advantage that when information apparatuses and diagnosis apparatuses are used it is also possible for an authentication check to be performed immediately in order to be able to promptly establish whether there are unauthenticated control apparatuses in the motor vehicle.

According to a further exemplary embodiment, the method further involves, when the external motor vehicle information apparatus and/or the external motor vehicle diagnosis apparatus is/are used, the result of the checking being that the received authentication response is invalid if the external motor vehicle information apparatus and/or the external motor vehicle diagnosis apparatus is/are not connected to an applicable diagnosis backend and/or information backend of the applicable vehicle manufacturer properly.

A diagnosis backend and/or information backend for the purposes of the invention may in this instance mean a server, a server network, a cloud and the like. Such a backend may in this instance store further information that may be necessary for an external motor vehicle information apparatus and/or an external motor vehicle diagnosis information to be able to connect to the monitoring apparatus in order to read information from the monitoring apparatus and/or from control apparatuses and/or to store information therein.

Properly for the purposes of the invention may in this instance mean that the external motor vehicle information apparatus and/or the external motor vehicle diagnosis apparatus needs to authenticate itself by means of the applicable backend. This can be effected by means of confirmation of being logged in on the backend and/or also by means of certification by the backend on the monitoring apparatus, for example. The monitoring apparatus can then grant access to the applicable control apparatus.

This embodiment has the advantage that an attempt at unauthenticated access to a control apparatus of the motor vehicle leads to the relevant control apparatus being transferred to a fallback mode in order to prevent manipulations on the control apparatus.

According to a further exemplary embodiment, the method further involves: pairing with the control apparatus of the motor vehicle. In this case, pairing involves at least information necessary for the authenticity information of the control apparatus being transmitted to the control apparatus, and pairing is preferably performed once with the control apparatus.

Pairing for the purposes of the invention may in this instance mean training the monitoring apparatus of the motor vehicle such that a relevant control apparatus can be identified as authentic in future in the event of a request therefrom.

The pairing can in this instance be effected such that first of all the monitoring apparatus and the control apparatus, for example, can exchange the public keys of the respective apparatuses among one another when a private/public key method is used. It is then possible for secure communication to be made possible between the two apparatuses.

Pairing can involve information being exchanged between the two apparatuses that allows future explicit authentication. By way of example, the monitoring apparatus can transmit one or more fundamental pieces of information required for authentication to the relevant control apparatus. From this information, the control apparatus can ascertain its authenticity code or its authenticity information and store it in a manner safe from extraneous access, for example. The relevant control apparatus can then take this authenticity information as a basis for ascertaining information to be transmitted as an authentication response, which can in turn be used by the monitoring apparatus in order to establish whether the control apparatus is precisely the one it claims to be.

To this end, there may possibly be provision, by way of example, for the control apparatus to transmit to the monitoring apparatus, after ascertaining the authenticity information, this or parts of this authenticity information during pairing in order to allow the monitoring apparatus to be able to explicitly establish the identity of the relevant control apparatus later.

If a control apparatus assembly needs to be replaced, that is to say a defective control apparatus thus needs to be replaced by an operational one, for example, a diagnosis apparatus can initiate fresh pairing of the new control apparatus with the monitoring apparatus, for example. This is necessary particularly if a merely one-off pairing process would otherwise not allow paring to be performed a second time for the same assembly in the vehicle.

This embodiment has the advantage that it is possible both for the information regarding the authenticity of the control apparatus to be transmitted in securely encrypted fashion, as an authenticity indication, and for the actual proof of authenticity to be provided in forgery-proof and explicit fashion, since the authenticity information can be generated merely during pairing of the two apparatus, from the information transmitted during pairing.

According to a further exemplary embodiment, the method further involving pairing involves passing at least part of the authentication information to the control apparatus or the authentication information being ascertained based on the pairing.

This embodiment has the advantage that the authenticity information can be generated more easily and the proof of authenticity can be provided more easily in the monitoring apparatus.

According to a further exemplary embodiment, the method further involves the fallback mode permitting merely rudimentary operation of the control apparatus.

Rudimentary operation for the purposes of the invention may in this instance mean basic operation of the control apparatus, which can be regarded as functionally safe for the purposes of vehicle dependability. This may in particular involve a severely limited scope of functions of the relevant control apparatus that allows just simple basic operation. The simplest possible basic operation may in this instance be completely inoperative operation of the control apparatus or a completely shut-down, for example de-energized, control apparatus.

This embodiment has the advantage that complex operation of an unauthenticated control apparatus is not possible.

The invention therefore makes it possible to establish whether and which control apparatuses or control apparatus assemblies are installed in the motor vehicle that have been installed in unauthenticated fashion. Further, the invention makes it possible to ensure that only authenticated control apparatuses or control apparatus assemblies can be operated with their full scope of functions in the applicable motor vehicle. Further, the invention makes it possible to perform a replacement of a control apparatus only in authenticated fashion, as a result of which it is possible to prevent abuse through the installation of forged, uncertified and/or stolen control apparatuses, or to ensure that such control apparatuses can be operated only safely and to a limited extent. It is also possible for such a control apparatus to be rendered completely inoperative.

Further, the invention makes it possible to prevent the authenticity information from being able to be read, ascertained or forged, since the authenticity information can be kept safe from reading and the authenticity information can be transmitted in a modified manner that does not allow the actual authenticity information to be explicitly inferred.

Additionally, the information used for authentication can be transmitted in encrypted fashion, for example by means of an established, secure private/public key method.

Further, a backend may also be involved in the pairing in order to ensure that the relevant control apparatus is also certified, that is to say is authorized for the relevant installation.

The introduction of this "secure" vehicle electrical system allows a mechanism to be provided that allows the components of a vehicle to be trained to vehicle-specific identification numbers, such as, for example, the chassis number. Authorized replacement, and unlocking by specialist personnel authorized or certified by the vehicle manufacturer, therefore continues to be possible in this way.

This can lead to an increase in security for the components specifically and the vehicle as a whole. Further, this can lead to a reduction in the number of vehicles broken into and components stolen in the field, and to a decrease in component forgery and/or a reduction in the installation of alternative, less functionally safe or dependable components.

The invention will be explained below in more detail using the figures, in which:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
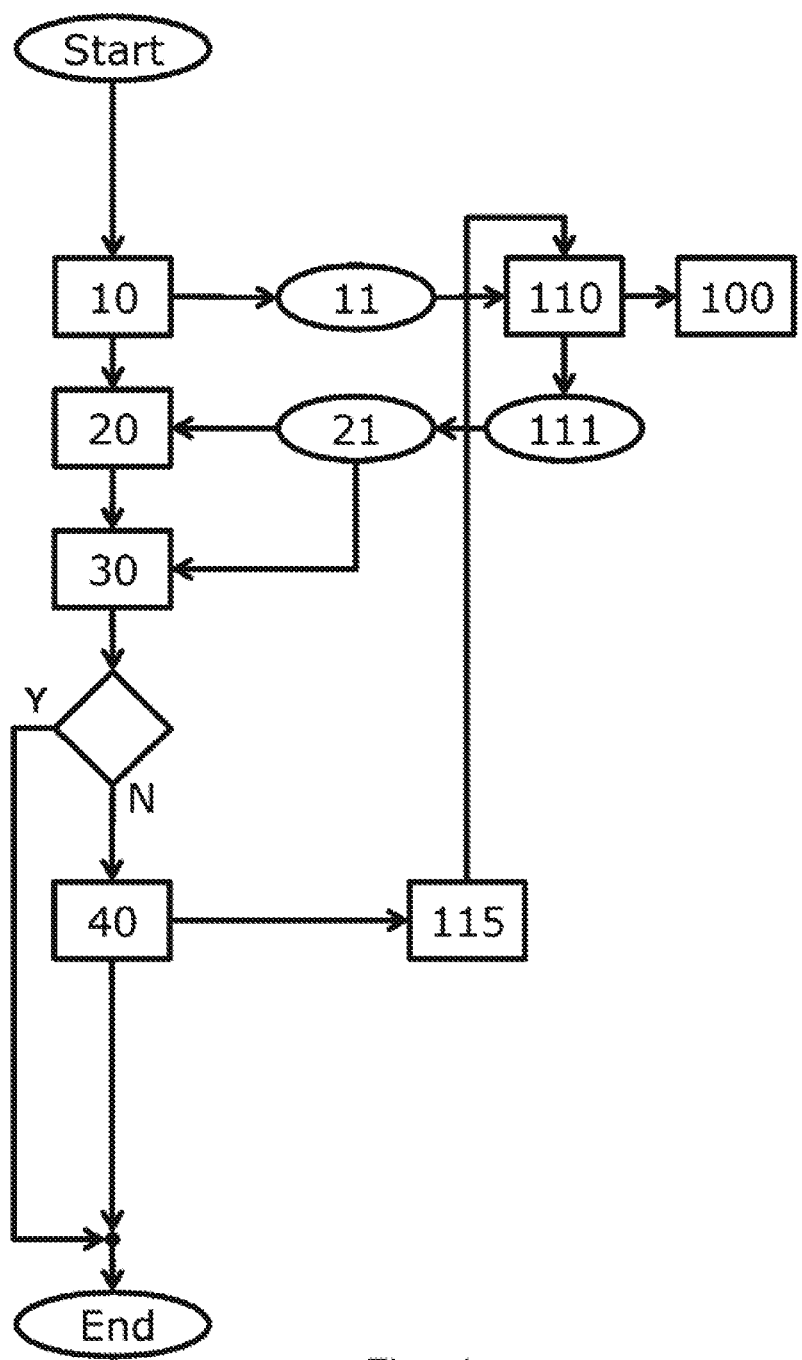
FIG. 1 shows a schematic depiction of a proposed method according to an exemplary embodiment of the invention.

FIG. 1 shows a schematic depiction of a proposed method according to an exemplary embodiment of the invention.

In this instance, FIG. 1 shows a schematic depiction of a method for secure authentication of control apparatuses 110 in a motor vehicle 100. The method involves: sending 10 an authentication request 11 to a control apparatus 110 of the motor vehicle 100, receiving 20 an authentication response 21 of the control apparatus 110, checking 30 the received authentication response 21, and, if the result of the checking 30 is that the received authentication response 21 is invalid: transferring 40 the control apparatus 110 to a fallback mode 115, the fallback mode 115 being safe for the purposes of a dependability of the applicable motor vehicle 100, and in this case the authentication response 21 of the control apparatus 110 is provided based on at least part of authenticity information 111 of the control apparatus 110. The transmitting 10, 20 of the authentication request 11 and authentication response 21 is effected in encrypted fashion in each case, and the checking 30 of the received authentication response 21 involves decrypting the received authentication response 21.

Figure 2:
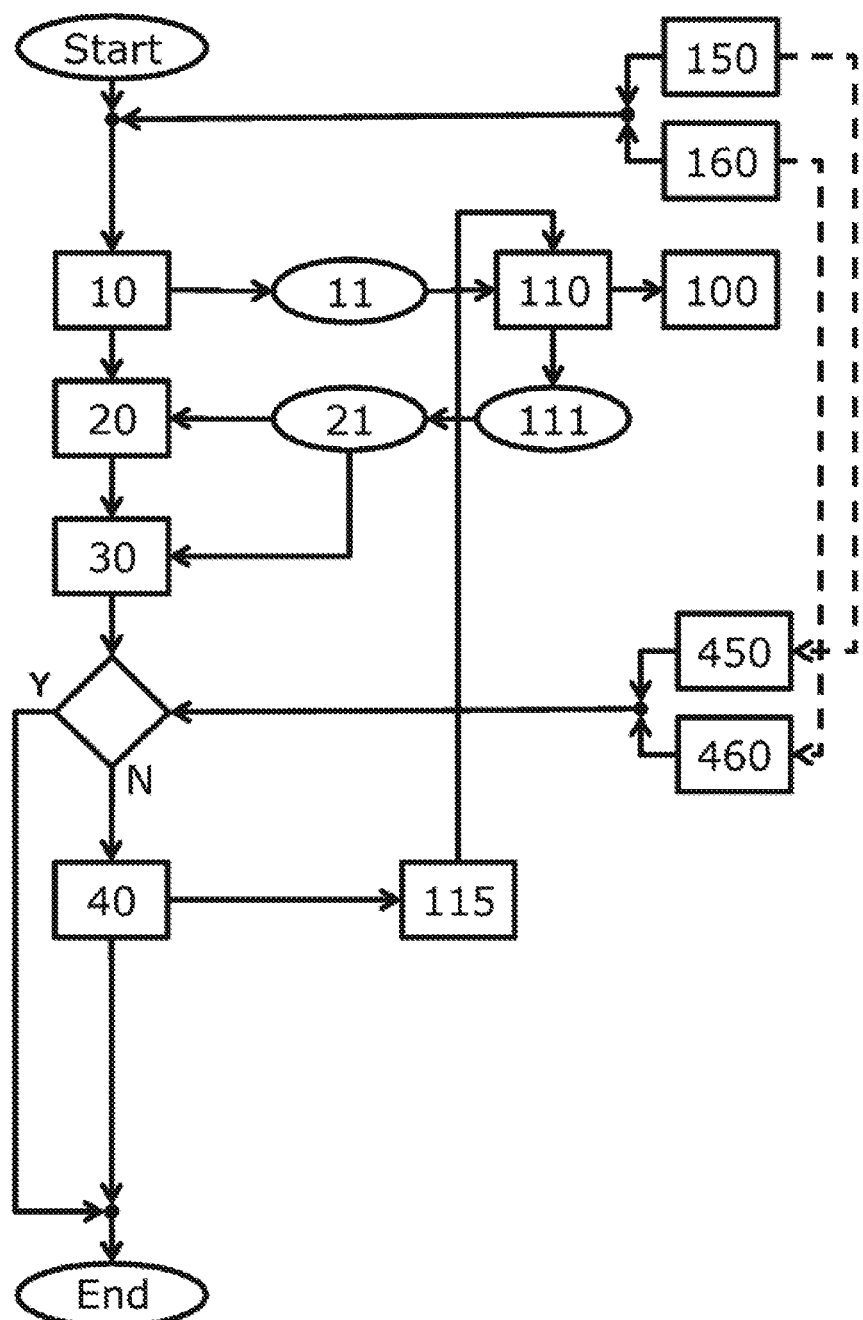
FIG. 2 shows a schematic depiction of a proposed method according to a further exemplary embodiment of the invention.

FIG. 2 shows a schematic depiction of a proposed method according to a further exemplary embodiment of the invention.

In this case, FIG. 2 shows a schematic depiction of a method developed further in relation to FIG. 1. The statements made above for FIG. 1 thus also continue to apply to FIG. 2.

FIG. 2 shows the method from FIG. 1, in which, further, the sending 10 of the authentication request 11 is triggered when an external motor vehicle information apparatus 150 and/or an external motor vehicle diagnosis apparatus 160 is/are used.

When the external motor vehicle information apparatus 150 and/or the external motor vehicle diagnosis apparatus 160 is/are used, the result of the checking 30 in this instance is that the received authentication response 21 is invalid if the external motor vehicle information apparatus 150 and/or the external motor vehicle diagnosis apparatus 160 is/are not connected to an applicable diagnosis backend 450 and/or information backend 460 of the applicable vehicle manufacturer properly.

Figure 3:
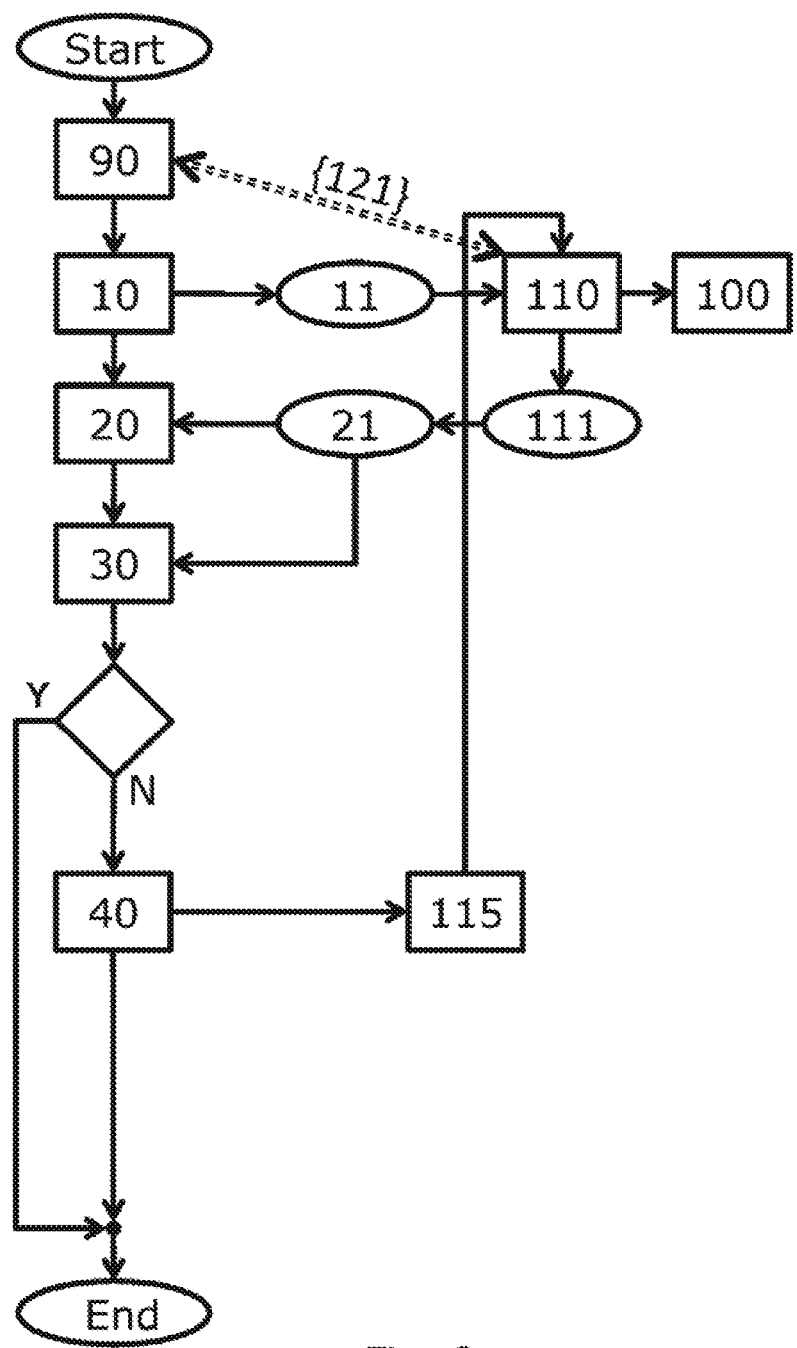
FIG. 3 shows a schematic depiction of a proposed method according to a further exemplary embodiment of the invention.

FIG. 3 shows a schematic depiction of a proposed method according to a further exemplary embodiment of the invention.

In this case, FIG. 3 shows a schematic depiction of a method that is developed further in relation to FIG. 1 and FIG. 2. The statements made above for FIG. 1 and FIG. 2 thus also continue to apply to FIG. 3.

FIG. 3 shows the method from FIG. 1, in which, further, pairing 90 with the control apparatus 110 of the motor vehicle 100 is effected beforehand. In this case, pairing 90 involves at least information 121 necessary for the authenticity information 111 of the control apparatus 110 being transmitted to the control apparatus 110, and pairing 90 is preferably performed with the control apparatus 110 only once.

By way of example, pairing 90 can be effected before delivery of the motor vehicle 100 to a car dealership, to an end customer and/or to its intended purpose, for example as a car sharing vehicle in a vehicle fleet specific to a vehicle manufacturer, and the like. In particular, pairing 90 can be effected before delivery of the motor vehicle 100 if pairing 90 is effected only once. Further, security mechanisms can be provided that prevent fresh pairing 90 or is able to be effected again only with permission of the vehicle manufacturer. This can be achieved by means of an applicable backend/server environment, for example, in which the permission for pairing 90 imperatively needs to be obtained beforehand.

Figure 4:
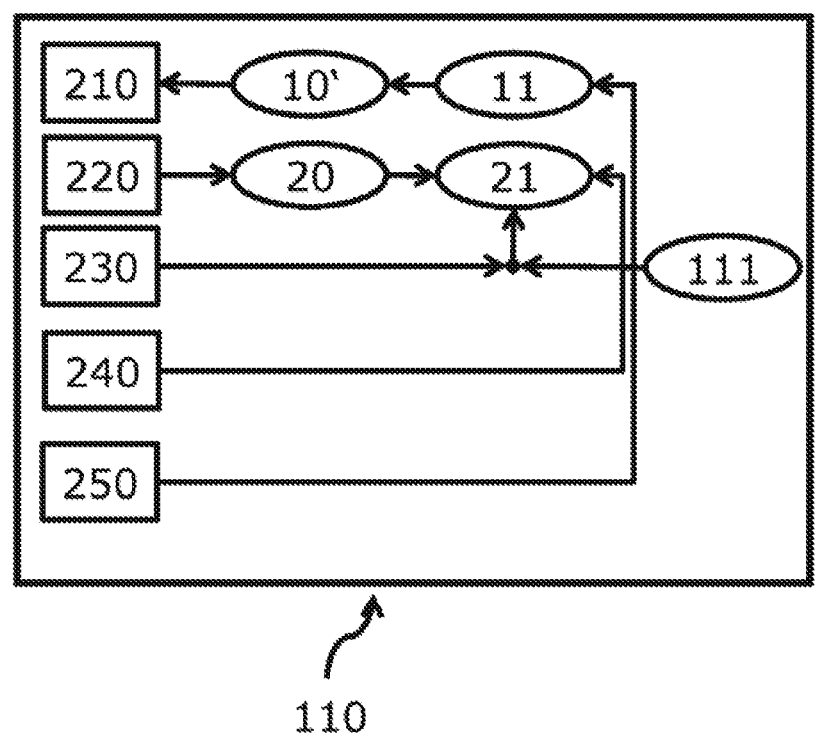
FIG. 4 shows a schematic depiction of a proposed apparatus according to a further exemplary embodiment of the invention.

FIG. 4 shows a schematic depiction of a proposed apparatus according to a further exemplary embodiment of the invention.

FIG. 4 shows a control apparatus 110 for a motor vehicle 100. The control apparatus 110 has: a reception means 210, for receiving 10' an authentication request 11, a transmission means 220, for sending 20 an authentication response 21, an ascertainment means 230, for ascertaining the authentication response 21, based on at least part of authenticity information 111 of the control apparatus 110, an encryption means 240, for encrypting the authentication response 21, and a decryption means 250, for decrypting the authentication request 11, and in this case the control apparatus 110 is configured to perform that part of any method according to the invention that relates to the control apparatus 110.

Figure 5:
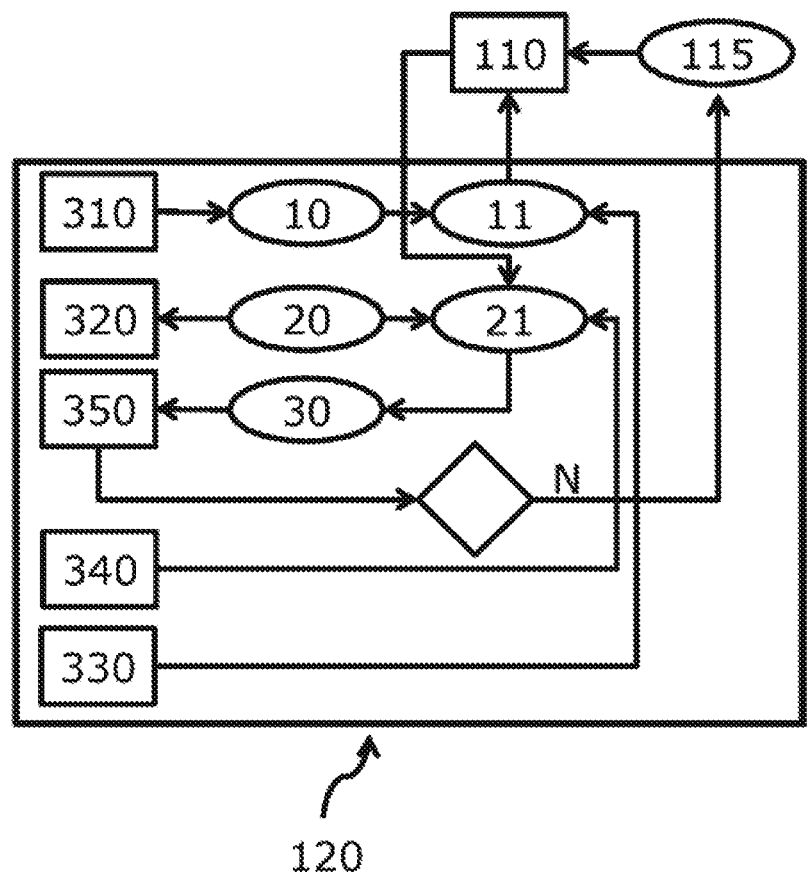
FIG. 5 shows a schematic depiction of a proposed apparatus according to a further exemplary embodiment of the invention.

FIG. 5 shows a schematic depiction of a proposed apparatus according to a further exemplary embodiment of the invention.

FIG. 5 shows a monitoring apparatus 120 for a motor vehicle 100. The monitoring apparatus 120 has: a transmission means 310, for sending 10 an authentication request 11 to a control apparatus 110 of the motor vehicle 100, a reception means 320, for receiving 20 an authentication response 21 of the control apparatus 110, an encryption means 330, for encrypting the authentication request 11, a decryption means 340, for decrypting the authentication response 21, and a checking means 350, for checking 30 the received authentication response 21. The monitoring apparatus 120 is in this instance configured to transfer the control apparatus 110 to a fallback mode 115 if the result of the checking 30 is that the received authentication response 21 is invalid. In this case, the fallback mode 115 is safe for the purposes of a dependability of the applicable motor vehicle 100, and in this case the control apparatus 120 is configured to perform that part of any method according to the invention that relates to the monitoring apparatus 120.

Figure 6:
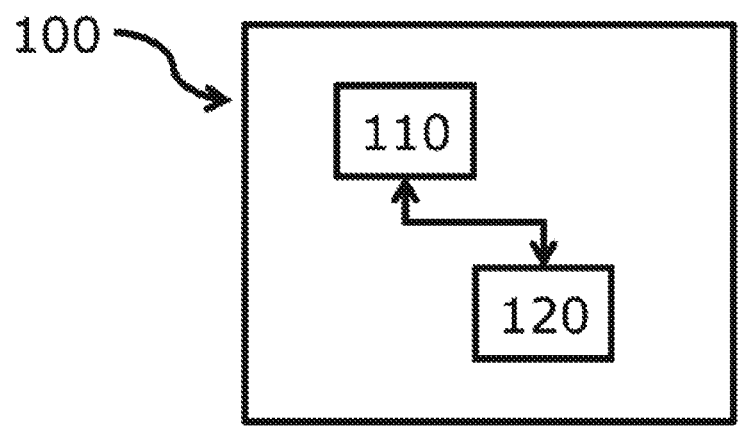
FIG. 6 shows a schematic depiction of a proposed motor vehicle according to a further exemplary embodiment of the invention.

FIG. 6 shows a schematic depiction of a proposed motor vehicle according to a further exemplary embodiment of the invention.

In this case, FIG. 6 shows a schematic depiction of a motor vehicle 100. The motor vehicle 100 in this instance has a control apparatus 110 according to the invention and a monitoring apparatus 120 according to the invention. In this case, the control apparatus 110 and the monitoring apparatus 120 are configured to perform any method according to the invention together.

LIST OF REFERENCE SIGNS

10 Sending an authentication request
10' Receiving an authentication request
11 Authentication request
20 Receiving an authentication response
21 Authentication response
30 Checking the received authentication response
40 Transferring the control apparatus to a fallback mode
90 Pairing with the control apparatus of the motor vehicle
100 Motor vehicle
110 Control apparatus
111 Authenticity information
112 Modified information
115 Fallback mode
120 Monitoring apparatus
121 Necessary information for the authenticity information of the control apparatus
150 Motor vehicle information apparatus
160 Motor vehicle diagnosis apparatus
210 Reception means, for receiving an authentication request
220 Transmission means, for sending an authentication response
230 Ascertainment means, for ascertaining the authentication response
240 Encryption means, for encrypting the authentication response
250 Decryption means, for decrypting the authentication request
310 Transmission means, for sending an authentication request to a control apparatus 320 Request means, for receiving an authentication response of the control apparatus
330 Encryption means, for encrypting the authentication request
340 Decryption means, for decrypting the authentication response
350 Checking means, for checking the received authentication response
450 Diagnosis backend
460 Information backend The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for secure authentication of control apparatuses in a motor vehicle, the method comprising:
    sending an encrypted authentication request to a control apparatus of the motor vehicle, wherein the control apparatus controls a vehicle function of the motor vehicle when in a non-fallback mode;
    receiving an encrypted authentication response of the control apparatus, wherein the authentication response of the control apparatus is provided based on at least part of authenticity information of the control apparatus;
    checking the received authentication response, wherein the checking includes decrypting the received authentication response; and
    transferring the control apparatus from the non-fallback mode to a fallback mode in response to a result of the checking being that the received authentication response is invalid, wherein the fallback mode prevents the control apparatus from controlling the vehicle function.

2. The method as claimed in claim 1, wherein the authentication response of the control apparatus is based on modified information from at least part of the authenticity information of the control apparatus.

3. The method as claimed in claim 2, wherein the modified information permits no explicit conclusion about the authenticity information of the control apparatus.

4. The method as claimed in claim 1, wherein the encrypted transmitting of the authentication request and authentication response is effected by an asymmetric encryption.

5. The method as claimed in claim 1, wherein the sending of the authentication request is triggered periodically after a stipulated period of time has elapsed.

6. The method as claimed in claim 1, the method further comprises,
    if the result of said checking is that the received authentication response is invalid, the result of the check is passed to an applicable diagnosis backend and/or information backend of the applicable vehicle manufacturer.

7. The method as claimed in claim 1, wherein the sending of the authentication request is triggered when an external motor vehicle information apparatus and/or an external motor vehicle diagnosis apparatus is/are used.

8. The method as claimed in claim 7, wherein when the external motor vehicle information apparatus and/or the external motor vehicle diagnosis apparatus is/are used, the result of the checking is that the received authentication response is invalid if the external motor vehicle information apparatus and/or the external motor vehicle diagnosis apparatus is/are not connected to an applicable diagnosis backend and/or information backend of the applicable vehicle manufacturer properly.

9. The method as claimed in claim 1, wherein the method further comprises, prior to said sending the authentication request:
    pairing with the control apparatus of the motor vehicle, wherein pairing comprises at least information necessary for the authenticity information of the control apparatus being transmitted to the control apparatus, and
    pairing is performed once with the control apparatus.

10. The method as claimed in claim 9, wherein pairing comprises passing at least part of the authentication information to the control apparatus or the authentication information is ascertained based on the pairing.

11. The method as claimed in claim 1, wherein the fallback mode permits only rudimentary operation of the control apparatus.

12. A motor vehicle, comprising:
    a control apparatus configured to control a vehicle function in a non-fallback mode, the control apparatus comprising:
        a reception means for receiving an authentication request,
        a transmission means for sending an authentication response,
        an ascertainment logic for ascertaining the authentication response based on at least part of authenticity information of the control apparatus,
        an encryption means for encrypting the authentication response, and
        a decryption means for decrypting the authentication request,
    a monitoring apparatus, comprising:
        a transmission means for sending the authentication request to the control apparatus,
        a reception means for receiving the authentication response of the control apparatus,
        an encryption means for encrypting the authentication request,
        a decryption means for decrypting the authentication response, and
        a checking means for checking the received authentication response such that, in response to a result of the checking being that the received authentication response is invalid, the monitoring apparatus transfers the control apparatus from the non-fallback mode to a fallback mode, wherein the fallback mode prevents the control apparatus from controlling the vehicle function.

13. The motor vehicle as claimed in claim 12, wherein the authentication response of the control apparatus is based on modified information from at least part of the authenticity information of the control apparatus.

14. The motor vehicle as claimed in claim 13, wherein the modified information permits no explicit conclusion about the authenticity information of the control apparatus.

15. The motor vehicle as claimed in claim 12, wherein the encrypted transmitting of the authentication request and authentication response is effected by an asymmetric encryption.

16. The motor vehicle as claimed in claim 12, wherein the sending of the authentication request is triggered periodically after a stipulated period of time has elapsed.

17. The motor vehicle as claimed in claim 12, wherein if the result of said checking is that the received authentication response is invalid, the result of the check is passed to an applicable diagnosis backend and/or information backend of the applicable vehicle manufacturer.

18. The motor vehicle as claimed in claim 12, wherein the sending of the authentication request is triggered when an external motor vehicle information apparatus and/or an external motor vehicle diagnosis apparatus is/are used.

19. The motor vehicle as claimed in claim 18, wherein when the external motor vehicle information apparatus and/or the external motor vehicle diagnosis apparatus is/are used, the result of the checking is that the received authentication response is invalid if the external motor vehicle information apparatus and/or the external motor vehicle diagnosis apparatus is/are not connected to an applicable diagnosis backend and/or information backend of the applicable vehicle manufacturer properly.

* * * * *